United States Patent
Shakib et al.

(10) Patent No.: US 7,293,016 B1
(45) Date of Patent: Nov. 6, 2007

(54) INDEX PARTITIONING BASED ON DOCUMENT RELEVANCE FOR DOCUMENT INDEXES

(75) Inventors: Darren Shakib, North Bend, WA (US); Gaurav Sareen, Bellevue, WA (US); Michael Burrows, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 10/762,823

(22) Filed: Jan. 22, 2004

(51) Int. Cl.
*G06F 17/30* (2006.01)
*G06F 7/00* (2006.01)

(52) U.S. Cl. .............. 707/3; 707/7; 707/10; 707/102; 709/201

(58) Field of Classification Search ............. 707/1–7, 707/10, 102, 104.1, 100; 709/201, 216
See application file for complete search history.

(56) References Cited

U.S. PATENT DOCUMENTS

| | | | |
|---|---|---|---|
| 5,375,235 A * | 12/1994 | Berry et al. .................. | 707/5 |
| 5,848,409 A * | 12/1998 | Ahn .............................. | 707/3 |
| 5,864,863 A * | 1/1999 | Burrows ................. | 707/103 R |
| 5,966,710 A * | 10/1999 | Burrows ................. | 707/103 R |
| 6,070,158 A * | 5/2000 | Kirsch et al. .................. | 707/3 |
| 6,526,440 B1 | 2/2003 | Bharat ........................ | 709/219 |
| 6,529,903 B2 | 3/2003 | Smith et al. ................... | 707/7 |
| 6,615,209 B1 | 9/2003 | Gomes et al. ................ | 707/5 |
| 6,658,423 B1 | 12/2003 | Pugh et al. ................. | 707/102 |
| 6,678,681 B1 | 1/2004 | Brin .............................. | 707/6 |
| 7,039,631 B1 * | 5/2006 | Finger, II ..................... | 707/3 |
| 2002/0123988 A1 | 9/2002 | Dean et al. .................... | 707/3 |

(Continued)

OTHER PUBLICATIONS

S. Brin and L. Page. *The Anatomy of a Large-Scale Hypertextual Web Search Engine.* Aug. 7, 2000. http://www7.scu.edu.au/programme/fullpapers/1921/com1921.htm.
D. Bahle, H. Williams and J. Zobel. *Optimised Phrase Querying and Browsing of Large Text Database.* 2001 IEEE. pp. 11-19.
J. Zobel and A. Moffat. *Inverted Files Versus Signature Files for Text Indexing.* 1999 ACM. pp. 453-490.
D. Bahle, H. Williams and J. Zobel. *Efficient Phrase Querying with an Auxiliary Index.* 2002 ACM. pp. 215-221.
D. Dreilinger and A. Howe. *Experiences with Selecting Search Engines Using Metasearch.* 1997 ACM. pp. 195-222.
N. Fuhr. *Two Models of Retrieval with Probabilistic Indexing.* 1986 ACM. pp. 249.
S. Bradshaw and K. Hammond. *Automatically Indexing Documents: Content vs. Reference.* 2002 ACM. pp. 180-181.

(Continued)

*Primary Examiner*—John Cottingham
*Assistant Examiner*—Susan F Rayyan

(57) ABSTRACT

Indexed documents are arranged in the index according to a static ranking and partitioned according to static ranking. Index queries reference the first partition and move to a subsequent partition when a static rank for the subsequent partition is higher than a weighted portion of the target score added to a weighted portion of a dynamic rank corresponding to the relevance of the results set generated thus far. By changing the weight of the target score and dynamic ranks in the subsequent partition score, searches can be stopped when no more relevant results will be found in the next partition.

30 Claims, 5 Drawing Sheets

U.S. PATENT DOCUMENTS

| | | | |
|---|---|---|---|
| 2002/0133481 A1 | 9/2002 | Smith et al. | 707/3 |
| 2003/0158866 A1* | 8/2003 | Goodwin et al. | 707/200 |
| 2004/0083224 A1* | 4/2004 | Yoshida | 707/100 |
| 2004/0143707 A1* | 7/2004 | Olarig et al. | 711/129 |
| 2005/0102270 A1* | 5/2005 | Risvik et al. | 707/2 |

OTHER PUBLICATIONS

A. Keller and J. Basu. *A predicate-based caching scheme for client-server database architectures*. The VLDB Journal 1996. pp. 35-47.

J. French. A. Powell, F. Gey and N. Perelman. *Exploiting a Controlled Vocabulary to Improve Collection Selection and Retrieval Effectiveness*. 2001 ACM. pp. 199-206.

K. Lee, H. Leong and A. Si. *Semantic Query Caching in a Mobile Environment*. Mobile Computing and Communications Review, vol. 3, No. 2. Date unknown but prior to Dec. 30, 2003. pp. 28-36.

M. Rodriguez-Martinez and N. Roussopoulos. *MOCHA: A Self-extensible Database Middleware System for Distributing Data Sources*. 2000 ACM. pp. 213-224.

K. Jarvelin, J. Kristensen, T. Niemi, E. Sormunen and H. Keskustalo. *a Deductive Data Model for Query Expansion*. 1996 ACM. pp. 235-243.

R. Goldman and J. Widom. *WSQ/DSQ: A Practical Approach for Combined Querying of Database and the Web*. 2000 ACM. pp. 285-295.

* cited by examiner

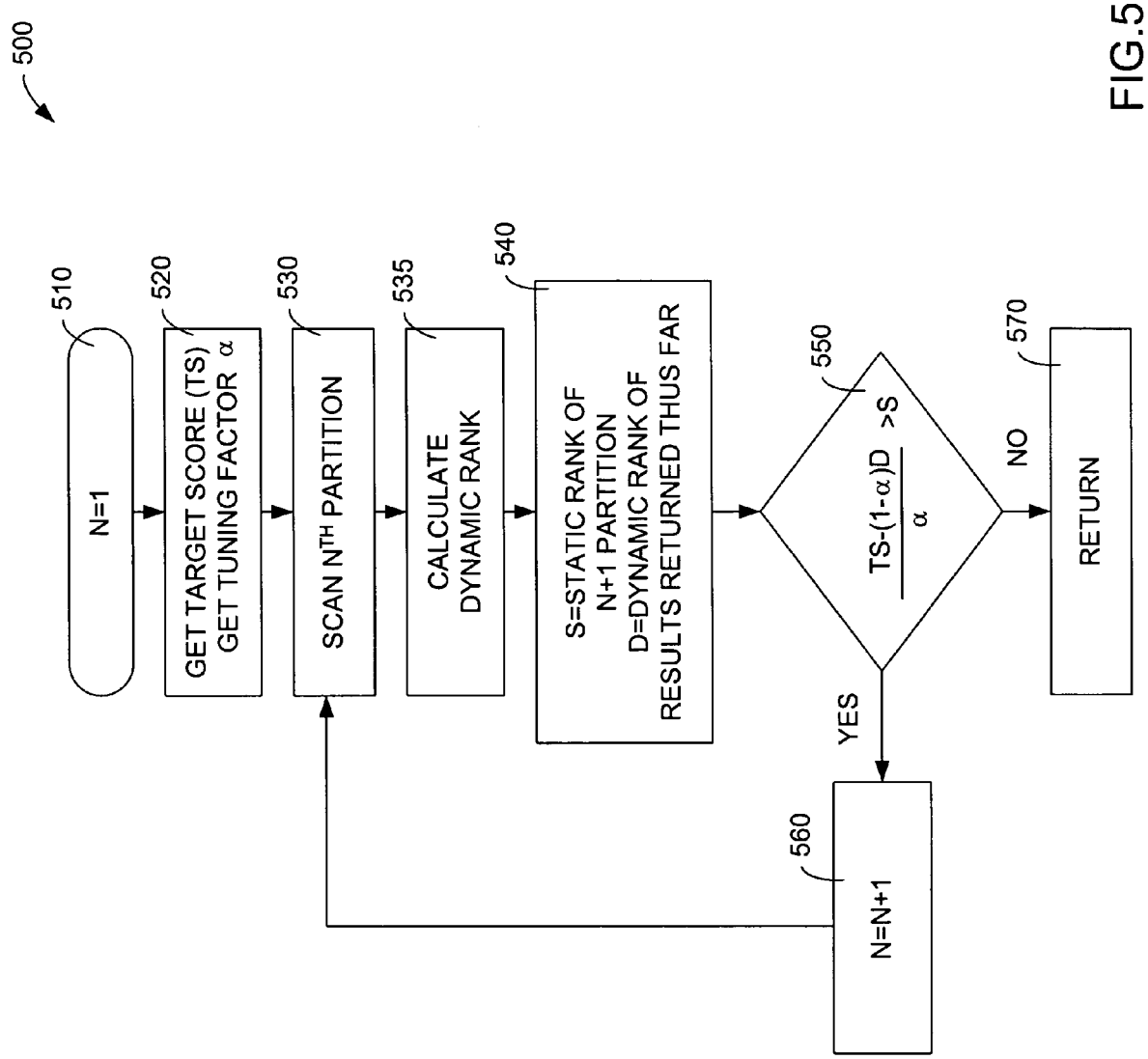

INDEX PARTITIONING BASED ON DOCUMENT RELEVANCE FOR DOCUMENT INDEXES

TECHNICAL FIELD

The invention pertains generally to the field of document indexing for use by internet search engines and in particular to an index scheme that partitions an index based on a projected relevance of documents.

BACKGROUND OF THE INVENTION

Typical document indexing systems have word occurrence data arranged in an inverted content index partitioned by document. The data is distributed over multiple computer systems that are dedicated to index storage with each computer system handling a subset of the total set of documents that are indexed. This allows for a word search query to be presented to a number of computer systems at once with each computer system processing the query with respect to the documents that are handled by the computer system.

An inverted word location index partitioned by document is generally more efficient than an index partitioned by word. This is because partitioning by word becomes expensive when it is necessary to rank hits over multiple words. Large amounts of information are exchanged between computer systems for words with many occurrences. Therefore, typical document index systems are partitioned by document and queries on the indexed documents are processed against the contents of the indexes until a sufficient results set is obtained. While the number of documents indexed in search engines is growing, in many cases the results for most queries come from a small portion of the entire set of documents. Therefore it may be inefficient to search indexes that contain documents that are less likely to return results in response to a query.

SUMMARY OF THE INVENTION

Storing and partitioning documents in an index based on relevance enables a search of the index to be terminated when sufficient results have been found without requiring a scan of the entire index.

A static rank is assigned to each document that captures a relative relevance of the document. The documents are ordered and partitioned based on the static rank of the documents. The ordered and partitioned documents are indexed by mapping a document location to words contained in the document. In response to a query the index partitions are searched in static rank order from highest to lowest. After each partition is searched a score is calculated based on the results returned so far and the static rank of the next partition. The calculated score is compared to a target score and no further partitions are searched once the calculated score exceeds the target score.

The static rank may be based on a number of links that refer to the document. Alternatively the static rank may be based on a number of times a document is accessed by previous queries. A dynamic rank can be used to quantify the quality of results returned so far. The dynamic rank may be based on a number of documents returned so far or a measure of the relevance of the documents returned so far.

BRIEF DESCRIPTION OF THE DRAWINGS

The present invention is illustrated by way of example and not limitation in the figures of the accompanying drawings, in which:

FIG. 5 is a flowchart of a method for practicing an embodiment of the present invention.

DETAILED DESCRIPTION OF THE PREFERRED EMBODIMENTS

Figure 1:
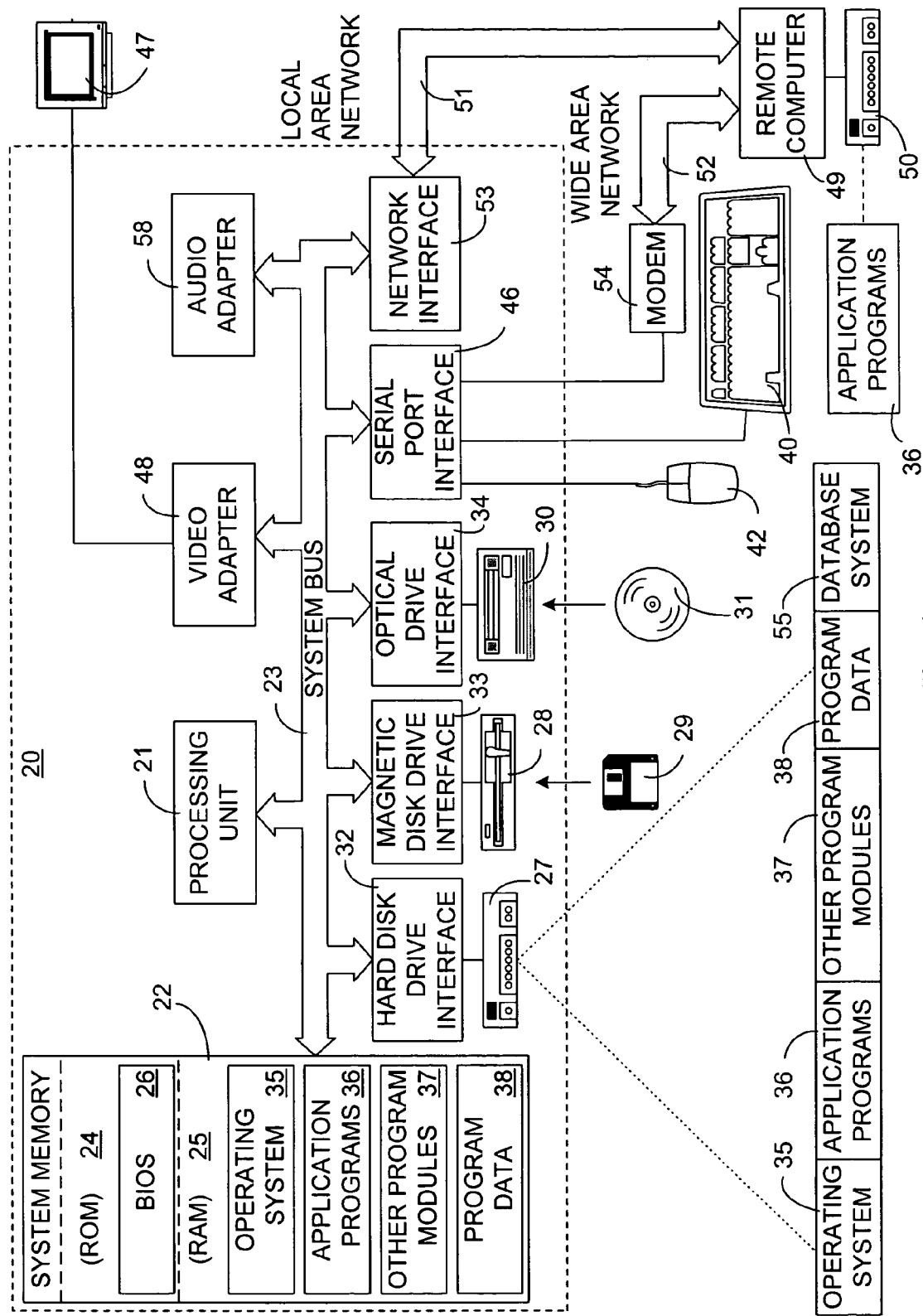
FIG. 1 illustrates an exemplary operating environment for a system for processing and routing database queries.
Figure 2:
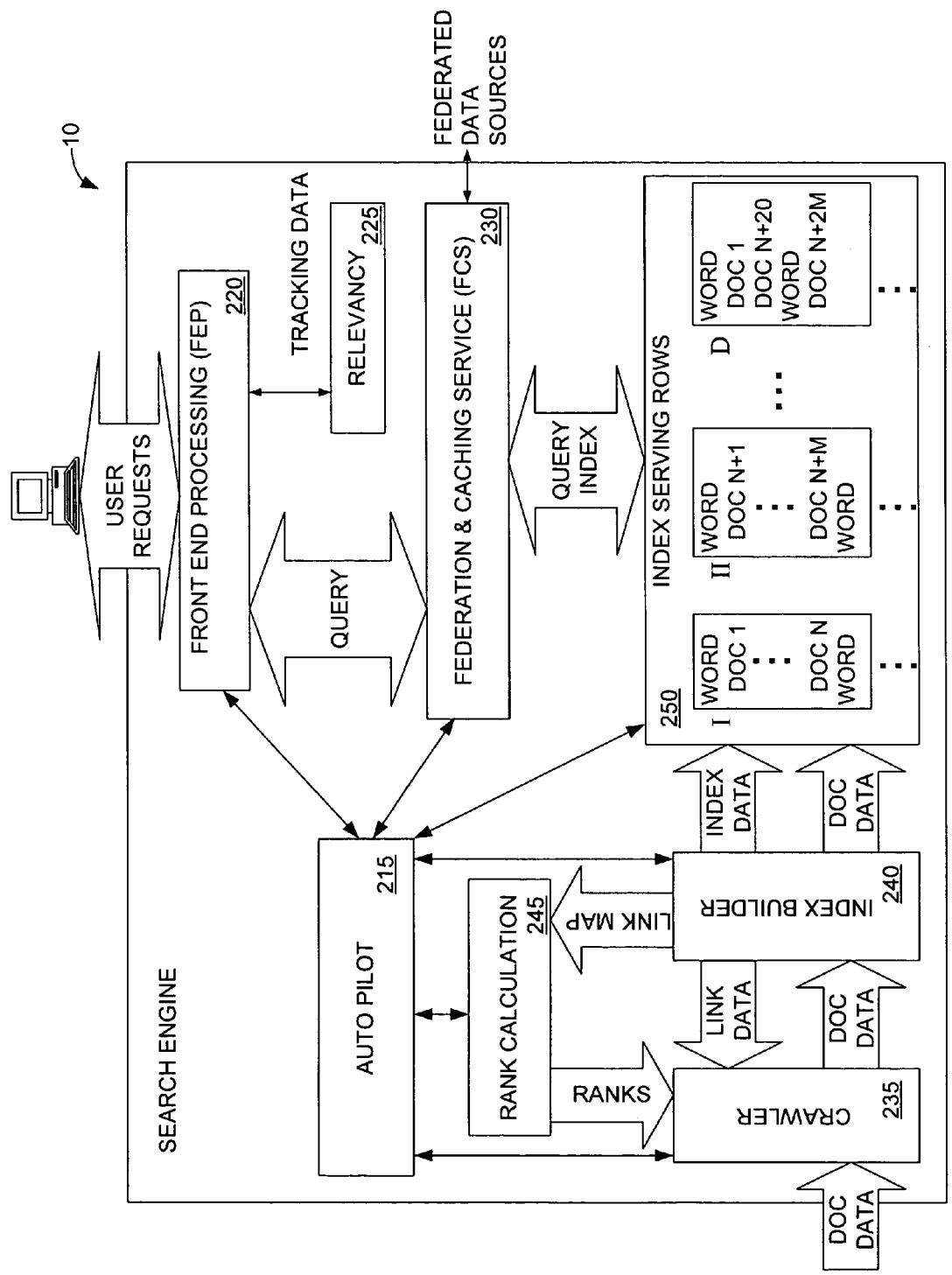
FIG. 2 is a block diagram of a computer system architecture for practicing an embodiment of the present invention.

FIG. 2 illustrates a block diagram of a search engine 10 that features a document index system that takes in document data and indexes the content of the documents by word. A web crawler 235 accesses documents on the internet to be indexed by the index system and passes the document data to an index builder 240 that parses the document and extracts words and word locations for storage in index serving rows 250. The web crawler, index builder, maintenance of the index serving rows as well as the search engine are typically constructed in software executing on a computer system 20 (FIG. 1). The computer system 20 is in turn coupled by means of communications connections to other computer systems by means of a network.

The index serving rows 250 can be constructed as a matrix of computer systems 20 with each computer system in a row storing word locations for a subset of the documents that have been indexed. Additional rows of computer systems 20 in the index serving rows may store copies of the data that is found in computer systems in the first row to allow for parallel processing of queries and back up in the event of computer system failure. The index information stored in each computer system 20 in the index serving rows is partitioned by the index builder 240. The size of the partition may range from a size that advantageously fits into cache memory to a single partition per computer system.

Index Partitioning Based on Document Relevance

As discussed in the background, partitioning by document is a typical way of constructing document indexes. While the number of documents indexed in search engines is growing, in many cases the results for most queries come from a small portion of the entire set of documents. In indexing schemes where documents are indexed without regard to the projected relevance of the documents much effort and expense will be wasted searching documents that have historically yielded few results.

Referring again to FIG. 2, a computer system layout architecture 10 for a document search system is shown. Auto pilot computer systems 215 coordinate the working of the other computer systems in the system as it processes user queries and requests. A rank calculation module 245 tracks the popularity of web sites and feeds this information to a web crawler 235 that retrieves documents from the internet based on links that exist on web pages that have been processed. An index builder 240 indexes the words that are found in the documents retrieved by the crawler 235 and passes the data to a set of index serving rows 250 that store the indexed information. In the embodiment described here, the index serving rows include ten "rows" or sets of five hundred computer systems in each row. Indexed documents are distributed across the five hundred computer systems in a row. The ten rows contain the same index data and are copies of one another to allow for parallel processing of requests and for back up purposes.

A front end processor 220 accepts user requests or queries and passes queries to a federation and caching service 230 that routes the query to appropriate external data sources as well as accessing the index serving rows 250 to search internally stored information. The query results are provided to the front end processor 220 by the federation and caching service 230 and the front end processor 220 interfaces with the user to provide ranked results in an appropriate format. The front end processor 220 also tracks the relevance of the provided results by monitoring, among other things, which of the results are selected by the user.

Figure 3:
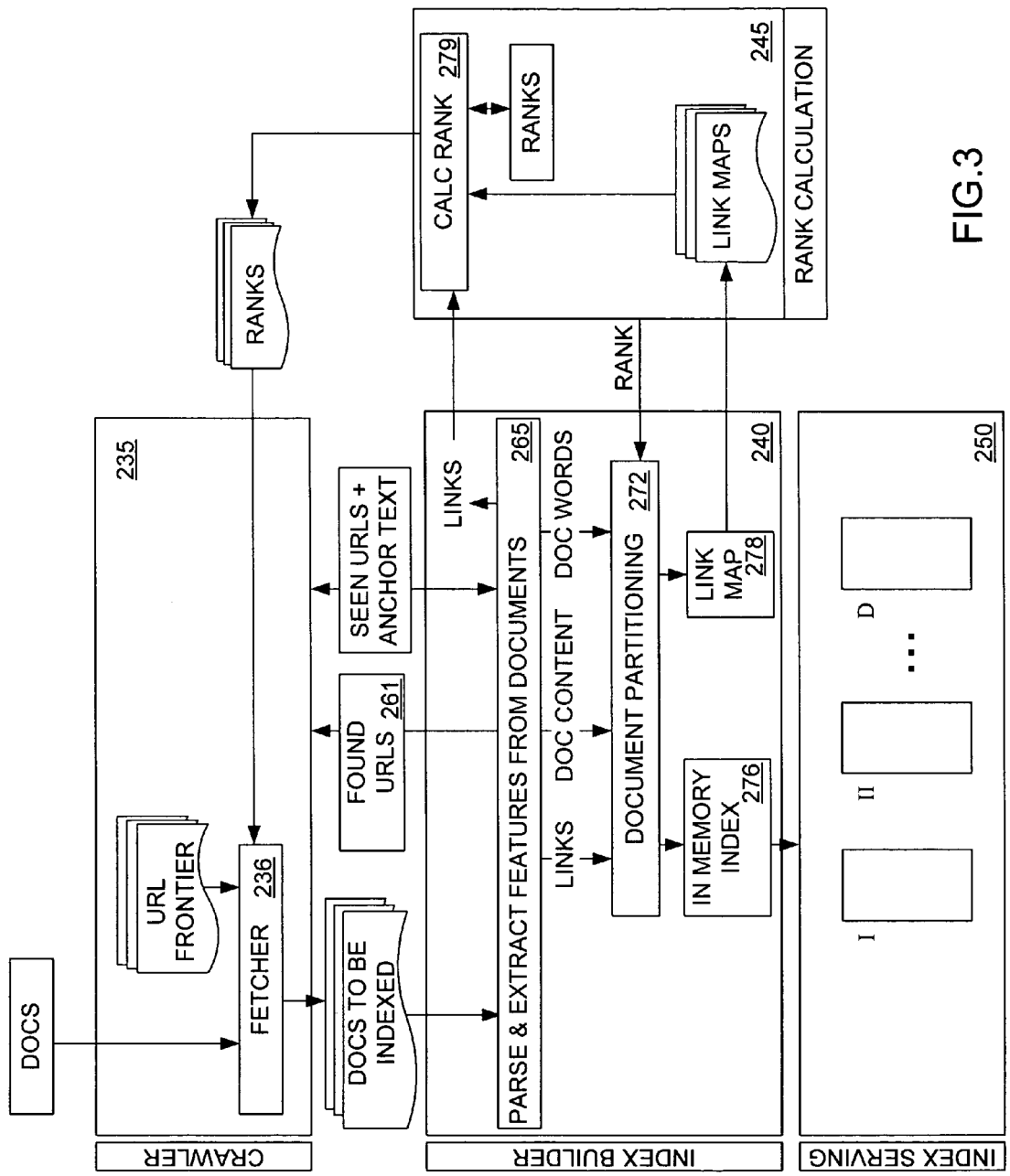
FIG. 3 is a functional block diagram of an index generation process that can be used in practice of an embodiment of the present invention.

FIG. 3 shows a functional block diagram that provides more detail on the functioning of the web crawler 235, index builder 240, and index serving rows 250. The crawler includes a fetcher component 236 that fetches documents from the web and provides the documents to be indexed to the index builder 240. Information about URLs found in the indexed documents 261 is fed to the crawler 235 to provide the fetcher 236 with new sites to visit. The crawler may use rank information from the rank calculation module 245 to prioritize the sites it accesses to retrieve documents.

Documents to be indexed are passed from the crawler 235 to the index builder 240 that includes a parser 265 that parses the documents and extracts features from the documents. A link map 278 that includes any links found in a document are passed to the rank calculating module 245. The rank calculating block 245 assigns a query-independent static rank to the document being parsed. This query-independent static rank can be based on a number of other documents that have links to the document, usage data for the URL being analyzed, or a static analysis of the document, or any combination of these or other factors.

Document content, any links found in the document, and the document's static rank are passed to a document partitioning module 272 that distributes the indexed document content amongst the computer systems in the index serving row by passing an in memory index 276 to a selected computer system. A link map 278 is provided to the rank calculation module 245 for use in calculating the static rank of future documents.

The documents whose index in each computer system is partitioned based on the static rank assigned to documents in the partition with documents of highest rank being located in partitions that are first accessed in response to a query. One or more thresholds are defined for the different partitions. These thresholds are based on estimates of what percentage of queries would likely be answered by documents in each range and by the size of each partition. It may be advantageous to place fewer documents in the higher ranked partitions. For example, documents having static rank values between 91-100 may go in a first partition, rank values of 51-90 in a second partition, and 1-50 in a third partition.

Partitioning provides multiple advantages. Less processing occurs since the queries are run on the smaller sets of documents first. I/O costs can be reduced since the smaller higher ranked partitions will get more queries and have greater cache locality. I/O operations can be eliminated for the highest ranked partitions if their data can be loaded into memory and this approach takes advantage of more efficient operating system memory management. Large page allocations can be used so that less CPU page table space is necessary and CPU cache efficiency is improved.

Figure 4:
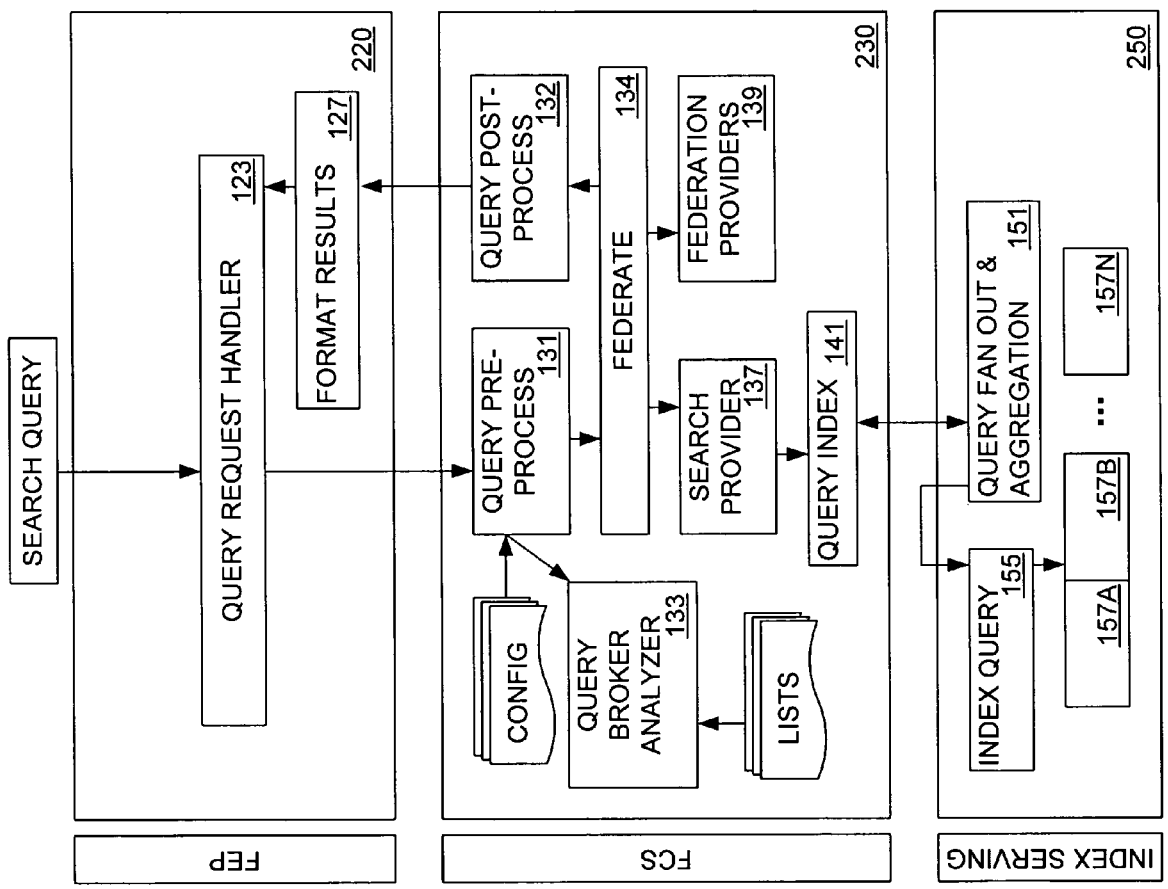
FIG. 4 is functional block diagram of an index serving process that can be used in practice of an embodiment of the present invention.

FIG. 4 illustrates a functional block diagram for the handling of search queries with respect to the index serving rows 250. The search query is routed to a query request handler 123 that directs the query to the federation and caching service 230 where preprocessing 131 is performed on the query to get it in better condition for presentation to a federation module 134 that selectively routes the query to data sources such as a search provider 137 and external federation providers 139. The search provider 137 is an "internal" provider that is maintained by the same provider as the search engine. External federation providers 139 are maintained separately and may be accessed by the search engine under an agreement with the search engine provider. To evaluate a query on the search provider 137, the search provider routes the query 141 to a query fan out and aggregation module 151 that distributes the query over the computer systems in a selected row of the index serving rows 250 and aggregates the results returned from the various computer systems. The index query 155 from the fan out module is executed on the first index partition in the computer system 157A that has the highest document static rank. The index query may also be executed in turn on successive index partitions 157A . . . 157N of lower ranking documents depending on several factors to be discussed below.

FIG. 5 is a flowchart illustrating a method 500 that can be used to determine whether it is necessary to search a next index partition or whether the results returned by accessing the previous index partition are sufficient to answer the query. This determination is made based on two factors: the static rank of documents in the next partition and a dynamic rank that characterizes the quality of the results set returned so far. The dynamic rank can be determined by simply counting the number of documents that have been found that answer the query. More complex approaches to computing a dynamic rank include a measure of the quality of the matching documents found thus far such as the prominence of the search word in the document or a number of times a search word is present in the document.

A counter N is initialized in step 510 for pointing to the correct index partition to be scanned. In step 520, a target score TS and tuning factor α are input. The target score relates to the quality of results that must be obtained before the scanning of index partitions is stopped. For example, a target score of 100 would mean that scanning would not be discontinued until it is determined that no more results will be found in the next partition. The tuning factor α determines the weight given to the static rank of the documents in the next partition relative to the weight given to the dynamic rank.

In step 530, a partition is scanned and results or hits are recorded. A hit occurs when a document containing a query search word is detected in the partition. A dynamic rank is calculated in step 535 based on the quality of the hits recorded so far using some quality metric as discussed above. In steps 540 and 550, a score is calculated for the results generated so far by applying the tuning factor α and its complement to the static rank of the next partition and dynamic rank of the results obtained so far, respectively. If the calculated score is higher than the target score, the next partition is scanned in steps 560 through 550 and if the calculated score is below the target score, the search process is halted and the results are returned, step 570.

The higher the portion of the ranking score that is derived from the static rank the less likely the next partition will be scanned and results will be obtained more quickly but the relevance of the results returned may be compromised. For example, a target score is set to 100 and α is set to "1" so that ranking score is based solely on the static rank of the next partition. If ten results is the number of results that are to be returned by a query, and ten results are found in the first partition scanned, regardless of quality of the results obtained so far. By comparison if the tuning factor α is set to "0.5" and the quality of the hits obtained so far is relatively low, then the next partition would be scanned because of the influence of the low dynamic rank in the equation. Another way to tune the scanning process is to lower the target score which will make it less likely that the next partition is scanned, but possibly at the price of less relevant results. The tuning factor α can be changed as a factor of load to relieve load from the system by halting scans earlier.

Stopping the scanning of indexes early has many advantages. Less memory is needed to cache the index since more queries are satisfied form a smaller set of the index. Because the most relevant documents are stored together, the portion of the index that is cached can be used to answer more queries. In some cases it may be possible to force the data for some partitions to fit completely in memory. Less memory can also be translated into less disk I/O operations and by only querying a smaller portion of the index also saves CPU time. Reading and ranking can take significant CPU resources and stopping the query early could save processing time.

Exemplary Operating Environment

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

It can be seen from the foregoing description that partitioning a document index based on document relevance and scanning only as much of the index as is necessary to obtain sufficient results saves memory and processing resources. Although the present invention has been described with a degree of particularity, it is the intent that the invention include all modifications and alterations from the disclosed design falling within the spirit or scope of the appended claims.

We claim:

1. For use with a search engine that processes user queries, a system that locates documents containing search words corresponding to a present user query comprising:
   at least one processor;
   at least one memory;
   an index builder that stores locations of documents indexed by word in an index based on a present query-independent static rank that has been assigned to each document;
   an index partitioner that orders and partitions the index into index partitions that each contain location information about a group of one or more documents having a continuous range of static ranks that is a subset of an overall range of static ranks;
   an index scanner that progressively scans the index partitions starting with a partition containing those documents with the highest static rank to locate documents containing a search word; and
   a scorer that calculates a score based on a present set of documents located thus far in the search and on the range of static ranks of a next partition to be scanned and wherein the index scanner scans the next partition to locate documents containing a search word when the calculated score is above a target score.

2. The system of claim 1 comprising a document ranker that assigns the static rank to a document and wherein the document ranker includes a link analyzer that detects a number of links that reference the document and wherein the static rank is a function of the number of links that reference the document.

3. The system of claim 2 wherein the document ranker includes a document usage monitor that detects a number of times the document has been accessed in response to a query and wherein the static rank is a function of the number of times the document has been accessed.

4. The system of claim 1 wherein the scorer comprises a dynamic rank computation module that computes a dynamic rank for the present set of located documents and wherein the score is based on the dynamic rank.

5. The system of claim 4 wherein the dynamic rank computation module computes the dynamic rank by totaling the number of located documents in the present set of located documents.

6. The system of claim 4 wherein the dynamic rank computation module computes the dynamic rank by determining a quality of match value for documents in the present set of located documents.

7. The system of claim 4 wherein the scorer calculates the score by adding a first weighted portion of the maximum static rank assigned to a document in the next partition to a second weighted portion of the dynamic rank, wherein the amount of weighting for the first and second weighted portions are determined by a tuning factor input by a user.

8. The system of claim 1 wherein the index partitioner partitions the index into such that the size of a partition is smaller than or equal to a cache size.

9. The system of claim 7 wherein the first and second weighted portions are determined based on system load.

10. For use with a search engine that processes user queries, a method for locating documents containing a search word found in a present user query comprising:
    assigning a present query-independent rank to each document to be searched;
    ordering the documents to be searched in order of the assigned present query-independent rank and grouping the ordered documents to be searched into partitions by present query-independent rank;
    indexing documents in a partition by mapping a location for each document to words contained in the document to form an index;
    scanning the partitions in present query-independent rank order by iteratively i) searching a highest ranked unsearched partition for a search word found in the user query to add to a present set of located documents located thus far; ii) calculating a score based on a present set of located documents and the present query-independent rank of documents indexed in a next highest ranking unsearched partition; iii) comparing the calculated score to a target score; and iv) continuing to search the next highest ranking unsearched partition until the calculated score is higher than the target score; and
    returning search results including the document locations in the present set of located documents when the calculated score is higher than a target score.

11. The method of claim 10 comprising detecting a number of links that reference a document and assigning a static rank to the document based on the number of links.

12. The method of claim 10 comprising monitoring document usage to determine a number of times a document has been retrieved by previous queries and assigning the present query-independent rank based on the number of time a document has been retrieved.

13. The method of claim 10 comprising grouping the ordered documents into partitions having a size smaller than a size of a cache designated for storing portions of the index.

14. The method of claim 10 comprising calculating the score by computing a dynamic rank for the present set of located documents.

15. The method of claim 14 comprising computing the dynamic rank by totaling a number of located documents in the present set of located documents.

16. The method of claim 14 comprising calculating the score by adding a first weighted portion of the dynamic rank to a second weighted portion of the highest present query-independent rank for a document in the next highest ranked partition.

17. The method of claim 16 comprising determining the first weighted portion based on a search engine load level.

18. One or more computer readable media comprising computer-executable instructions for performing the method of claim 10.

19. For use with a search engine that processes user queries, one or more computer readable media storing computer readable instructions for retrieving documents containing search words in a query by:
    assigning a static rank to documents;
    indexing the documents by mapping document locations to words contained in the document to construct an index;
    ordering and partitioning the index by document based on the static rank assigned to the document;

iteratively searching, in static rank order, a highest ranking unsearched partition to return locations for documents containing search words in the query; calculating a score based on a relevance of documents returned and the static rank assigned to a next partition to be searched;

and continuing to search the next partition until the calculated score is higher than a target score; and returning document locations as a query result when the calculated score exceeds the target score.

20. The one or more computer readable media of claim 19 wherein the static rank is assigned to a document based on a number of documents that reference the document.

21. The one or more computer readable media of claim 19 wherein the static rank is assigned based on a number of times the document has been returned by previous queries.

22. The one or more computer readable media of claim 19 wherein the score is calculated by calculating a dynamic rank based on the relevance of documents returned thus far in the search.

23. The one or more computer readable media of claim 22 wherein the dynamic rank is calculated based on a number of documents returned thus far in the search.

24. The one or more computer readable media of claim 22 wherein the score is calculated by adding a first weighted portion of the dynamic rank to a second weighted portion of the static rank of a document in the next partition to be searched.

25. For use with a search engine that processes user queries, an apparatus for locating documents containing a search word found in a present user query comprising:

means for assigning a present query-independent rank to each document to be searched;

means for ordering the documents to be searched in order of the assigned present query-independent rank and grouping the ordered documents to be searched into partitions by present query-independent rank;

means for indexing documents in a partition by mapping a location for each document to words contained in the document to form an index;

means for scanning the partitions in present query-independent rank order by iteratively i) searching a highest ranked unsearched partition for a search word found in the user query to add to a present set of located documents located thus far; ii) calculating a score based on a present set of located documents and the present query-independent rank of documents indexed in a next highest ranking unsearched partition; iii) comparing the calculated score to a target score; and iv) continuing to search the next highest ranking unsearched partition until the calculated score is higher than the target score; and means for returning search results including the document locations in the present set of located documents when the calculated score is higher than a target score.

26. The apparatus of claim 25 comprising means for detecting a number of links that reference a document and wherein the means for assigning a present query-independent rank assigns the rank to the document based on the number of links.

27. The apparatus of claim 25 comprising means for monitoring document usage to determine a number of times a document has been retrieved by previous queries and wherein the means for assigning the present query-independent rank assigns the rank based on the number of time a document has been retrieved.

28. The apparatus of claim 25 comprising means for calculating the score by computing a dynamic rank for the present set of located documents.

29. The apparatus of claim 28 wherein the means for computing the dynamic rank computes the dynamic rank by totaling a number of located documents in the present set of located documents.

30. The apparatus of claim 28 wherein the means for calculating the score calculates the score by adding a first weighted portion of the dynamic rank to a second weighted portion of the highest present query-independent rank for a document in the next highest ranked partition.

* * * * *